US010387895B2

(12) United States Patent
Robeen

(10) Patent No.: US 10,387,895 B2
(45) Date of Patent: Aug. 20, 2019

(54) METHOD AND SYSTEM FOR TRANSFER OF CONSUMER DATA TO MERCHANTS

(71) Applicant: MasterCard International Incorporated, Purchase, NY (US)

(72) Inventor: Erica Robeen, Hardin, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 937 days.

(21) Appl. No.: 14/454,024

(22) Filed: Aug. 7, 2014

(65) Prior Publication Data

US 2016/0042365 A1 Feb. 11, 2016

(51) Int. Cl.

*G06Q 20/20* (2012.01)
*G06Q 20/32* (2012.01)
*G06Q 30/02* (2012.01)

(52) U.S. Cl.

CPC ....... *G06Q 30/0201* (2013.01); *G06Q 20/202* (2013.01); *G06Q 20/3278* (2013.01)

(58) Field of Classification Search

CPC ............. G06Q 30/0201; G06Q 20/202; G06Q 20/3278

See application file for complete search history.

(56) References Cited

U.S. PATENT DOCUMENTS

2002/0152123 A1* 10/2002 Giordano ............... G06Q 20/04 705/14.33
2003/0126076 A1* 7/2003 Kwok .................... G06Q 20/04 705/40
2008/0046366 A1* 2/2008 Bemmel ................ G06Q 20/20 705/44
2008/0208743 A1* 8/2008 Arthur ................ G06Q 20/105 705/41
2012/0158566 A1* 6/2012 Fok ........................ G06Q 40/00 705/35
2013/0264385 A1* 10/2013 Stoudt .................... G06Q 20/34 235/380

* cited by examiner

*Primary Examiner* — A. Hunter Wilder
*Assistant Examiner* — Joseph M Mutschler
(74) *Attorney, Agent, or Firm* — Buchanan Ingersoll & Rooney PC

(57) ABSTRACT

A method for sharing consumer data with a merchant includes: storing, in an account database at least one account profile, wherein each account profile includes data related to a transaction account including at least an account identifier and a plurality of sharing data values; receiving, from a point of sale device, an authorization request for a payment transaction, wherein the authorization request includes at least a specific account identifier and a sharing request; identifying, in the account database, a specific account profile where the included account identifier corresponds to the specific account identifier; identifying, in the specific account profile, one or more sharing data values of the plurality of sharing data values for sharing to the point of sale device; and transmitting, by a transmitting device, the identified one or more sharing data values to the point of sale device.

3 Claims, 11 Drawing Sheets

100

METHOD AND SYSTEM FOR TRANSFER OF CONSUMER DATA TO MERCHANTS

FIELD

The present disclosure relates to the transfer of consumer data to merchants, specifically the sharing of consumer data with a merchant as part of the authorization of a payment transaction without requiring additional interaction by the consumer.

BACKGROUND

In an effort to improve their relationship with consumers, as well as encourage repeat business, many merchants make an effort to gather information about their consumers. In some instances, merchants will gather contact information from a consumer that conducts a transaction with them, for use in providing newsletters, advertisements, offers, or other content that can potentially lead to future transactions with the consumer, and thereby more business.

However, current methods for gathering a consumer's data at a merchant point of sale are often time consuming. For example, in some methods, consumers are prompted to provide their e-mail address, phone number, or other contact information at the point of sale, after which an employee manually enters the provided information into the point of sale system. In many situations, consumers conducting transactions aim to finish the transaction as quickly as possible, and may refuse to provide their contact information as it could prolong the transaction. In addition, some consumers may be apprehensive of providing personal contact information to an employee audibly, as others in the vicinity may overhear, or the consumer may not trust the employee with the information.

Furthermore, manual input of contact information into a point of sale system is often prone to errors. For instance, the consumer may provide inaccurate information, the employee may mishear the information, or the employee may enter the information into the point of sale system incorrectly. Thus, even if a consumer is located that is willing to spend the extra transaction time to provide their contact information, and is willing to trust the employee and any others within hearing range with their contact information, the information may still be gathered inaccurately, and thus unusable.

Thus, there is a need for a technical system to provide for easier, more effective, and more secure sharing of consumer data with a merchant.

SUMMARY

The present disclosure provides a description of systems and methods for sharing consumer data with a merchant.

A method for sharing consumer data with a merchant includes: storing, in an account database at least one account profile, wherein each account profile includes data related to a transaction account including at least an account identifier and a plurality of sharing data values; receiving, from a point of sale device, an authorization request for a payment transaction, wherein the authorization request includes at least a specific account identifier and a sharing request; identifying, in the account database, a specific account profile where the included account identifier corresponds to the specific account identifier; identifying, in the specific account profile, one or more sharing data values of the plurality of sharing data values for sharing to the point of sale device; and transmitting, by a transmitting device, the identified one or more sharing data values to the point of sale device.

A method for receiving shared consumer data includes: storing, in a memory, transaction details for a payment transaction, wherein the transaction details include at least an account identifier and transaction data; generating, by a processing device, an authorization request for the payment transaction, wherein the authorization request includes at least the account identifier and transaction data; transmitting, by a transmitting device, the generated authorization request; and receiving, by a receiving device, one or more sharing data values, wherein the one or more sharing data values are associated with a transaction account associated with the account identifier.

A system for sharing consumer data with a merchant includes an account database, a receiving device, a processing device, and a transmitting device. The account database is configured to store at least one account profile, wherein each account profile includes data related to a transaction account including at least an account identifier and a plurality of sharing data values. The receiving device is configured to receive, from a point of sale device, an authorization request for a payment transaction, wherein the authorization request includes at least a specific account identifier and a sharing request. The processing device is configured to: identify, in the account database, a specific account profile where the included account identifier corresponds to the specific account identifier; and identify, in the specific account profile, one or more sharing data values of the plurality of sharing data values for sharing to the point of sale device. The transmitting device is configured to transmit the identified one or more sharing data values to the point of sale device.

A system for receiving shared consumer data includes a memory, a processing device, a transmitting device, and a receiving device. The memory is configured to store transaction details for a payment transaction, wherein the transaction details include at least an account identifier and transaction data. The processing device is configured to generate an authorization request for the payment transaction, wherein the authorization request includes at least the account identifier and transaction data. The transmitting device is configured to transmit the generated authorization request. The receiving device is configured to receive one or more sharing data values, wherein the one or more sharing data values are associated with a transaction account associated with the account identifier.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Transaction Network—A system or network used for the transfer of money via the use of cash-substitutes. Transaction networks may use a variety of different protocols and procedures in order to process the transfer of money for various types of transactions. Transactions that may be performed via a transaction network may include product or service purchases, credit purchases, debit transactions, fund transfers, account withdrawals, etc. Transaction networks may be configured to perform transactions via cash-substitutes, which may include payment cards, letters of credit, checks, financial accounts, etc. Examples of networks or systems configured to perform as transaction networks include those operated by MasterCard®, VISA®, Discover®, American Express®, etc.

Transaction Account—A financial account that may be used to fund a transaction, such as a checking account, savings account, credit account, credit or debit card account, virtual transaction account, etc. A transaction account may be associated with a consumer, which may be any suitable type of entity associated with a transaction account, which may include a person, family, company, corporation, governmental entity, etc. In some instances, a transaction account may be virtual, such as those accounts operated by PayPal®, etc.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Sharing Consumer Data

Figure 1A:
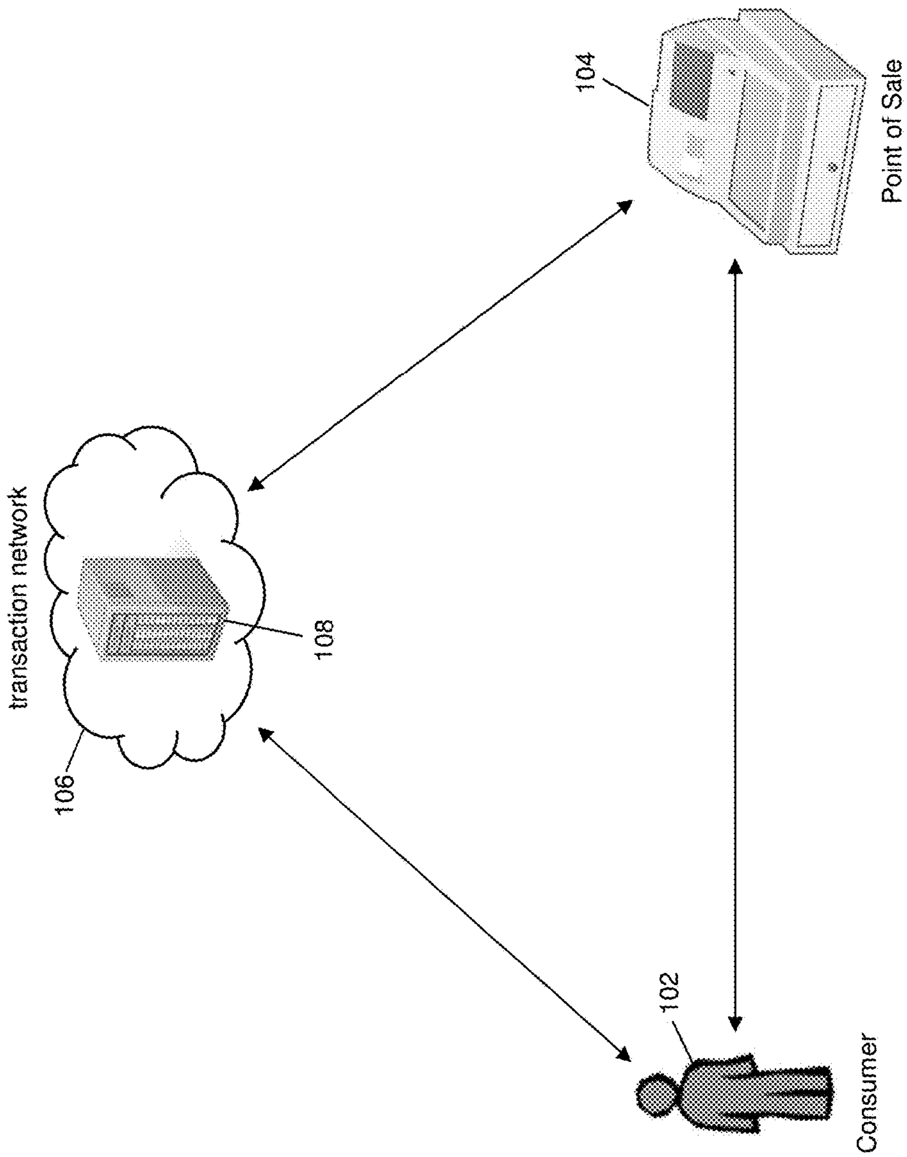
FIGS. 1A and 1B are high level architectures illustrating systems for the sharing of consumer data with a merchant accordance with exemplary embodiments.

FIG. 1A illustrates a system 100 for the sharing of consumer data with a merchant.

The system 100 may include a consumer 102. The consumer 102 may conduct a payment transaction at a point of sale 104 of a merchant. The point of sale 104, discussed in more detail below, may be a physical point of sale at a physical location of the merchant, or may be a virtual point of sale, such as an e-commerce website operated by or on behalf of the merchant. As part of the payment transaction, the consumer 102 may be prompted to share their contact information or other information associated with themselves (e.g., consumer information) with the merchant. In some embodiments, the consumer 102 may be prompted by an employee. In other embodiments, the consumer 102 may be prompted by the point of sale 104 (e.g., at a self-service kiosk).

The consumer 102 may indicate their approval to share their data with the merchant. The point of sale 104 may receive input regarding the consumer's 102 approval, and may then transmit transaction data for the payment transaction, including an indication of the consumer's 102 assent to share their data, to a transaction network 106 for processing of the payment transaction and retrieval of shared consumer data. It will be apparent to persons having skill in the relevant art that the transaction data transmitted by the point of sale 104 may be initially transmitted to one or more other computing systems prior to transmission to the transaction network 106 in the form of an authorization request, such as a financial institution (e.g., an acquiring bank).

The transaction network 106 may receive the transaction data and may process the transaction using traditional methods and systems that will be apparent to persons having skill in the relevant art. The transaction network 106 may include a processing server 108. The processing server 108, discussed in more detail below, may be configured to identify shared consumer data and transmit the data to the point of sale 104 upon the receipt of the indication of the consumer's 102 assent to provide the data.

As discussed in more detail below, the processing server 108 may store an account profile associated with the consumer 102. The account profile may be identified via data included in the transaction data, such as a transaction account number (e.g., associated with a payment card used in the transaction), a username (e.g., provided by the consumer 102 as part of the transaction), a loyalty number, a consumer identification number, an e-mail address, a phone number, biometric data, or any other suitable means for identification that will be apparent to persons having skill in the relevant art.

The account profile may include a plurality of sharing data values for the consumer 102. The sharing data values may include any type of data associated with the consumer 102 that may be shared with a merchant, such as contact information (e.g., e-mail address, phone number, street address, mailing address, username, social network identifier, etc.), demographic information (e.g., age, gender, income, residential status, familial status, marital status, occupation, education), spending information (e.g., purchase behavior, spend behavior, transaction history), loyalty information (e.g., reward account data), offer redemption history, consumer preferences, and any other suitable data as will be apparent to persons having skill in the relevant art.

The processing server 108 may then transmit the identified sharing data values for the consumer 102 to the point of sale 104. In some embodiments, the sharing data values may be included in an authorization response for the payment transaction. In a further embodiment, the sharing data values may only be included in an authorization response that indicates approval of the payment transaction. In other embodiments, the sharing data values may be transmitted in a separate message to the point of sale 104. In some embodiments, the point of sale 104 may transmit a request for sharing data values separate from the authorization request, and the sharing data values may be transmitted in response.

In some instances, the point of sale 104 may transmit an authorization request to the transaction network 106 in the usual course of business, without a request for sharing data values. During the processing of the transaction, the processing server 108 may identify that the consumer 102 involved in the transaction has provided sharing data values that they are willing to share with merchants. In such an instance, the authorization response transmitted to the point of sale 104 may indicate the consumer's 102 willingness to share their data. The point of sale 104 may then transmit a request for sharing data values, which the processing server 108 may identify and provide in a response.

In some instances, the authorization request may include specific requested sharing data values (e.g., specified by the point of sale 104). In such an instance, the processing server 108 may provide only the requested sharing data values to the point of sale 104.

Figure 1B:
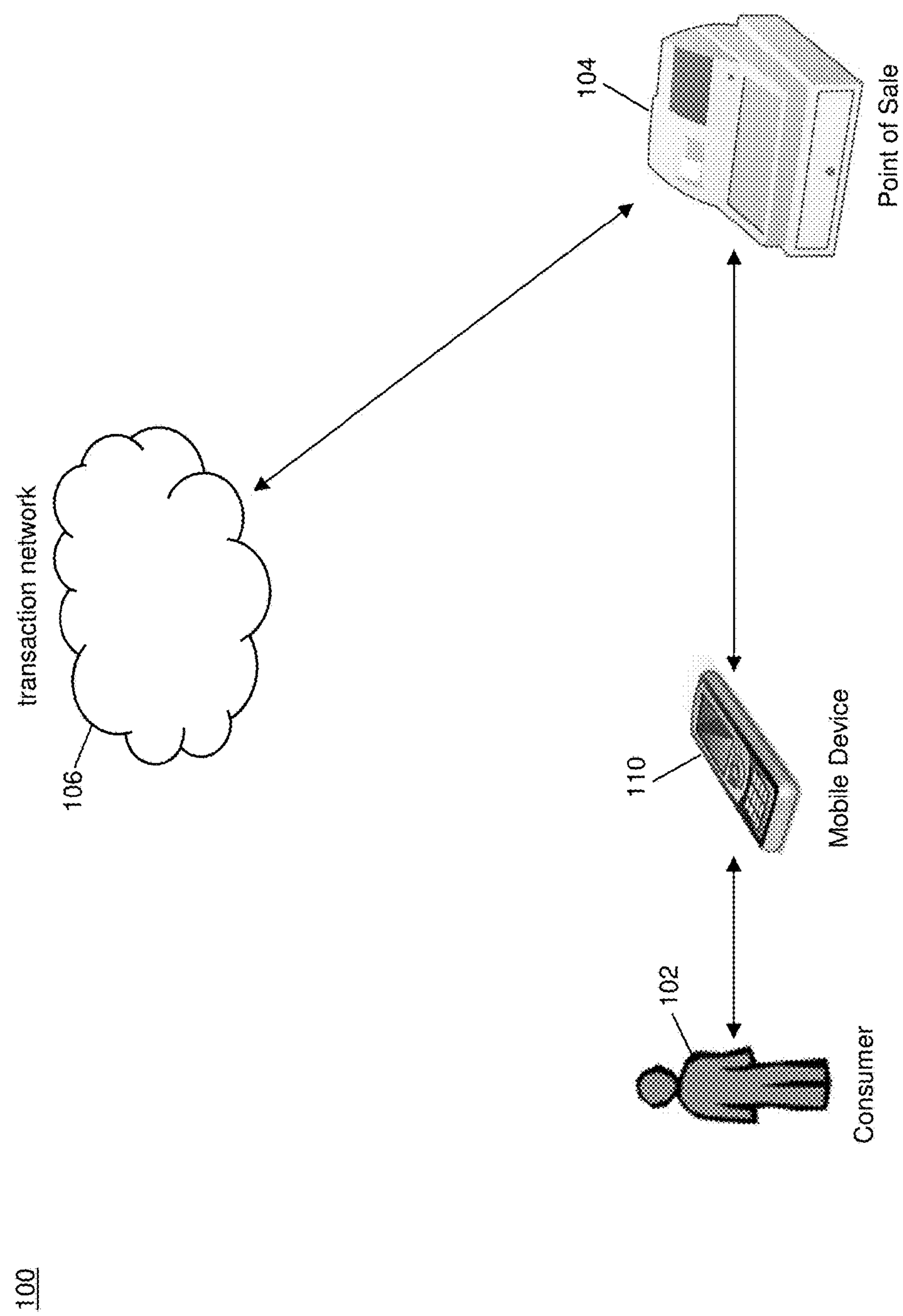

FIG. 1B illustrates an alternative system 100 where the shared consumer data may be provided to the point of sale 104 via a consumer mobile device 110.

The mobile device 110, discussed in more detail below, may be a mobile communication device configured to be used to convey payment details to the point of sale 104 for a payment transaction. For instance, the mobile device 110 may be a smart phone, cellular phone, personal digital assistant, smart watch, tablet computer, or other suitable device and may include a digital wallet application program or other suitable application for the storage and transmission of payment details for use in funding a payment transaction. Methods and systems for the storage and transmission of payment details to a point of sale 104 using a mobile device 110 will be apparent to persons having skill in the relevant art.

When the consumer 102 conducts a payment transaction at the point of sale 104, the consumer 102 may use the mobile device 110 in order to pay for the transaction. As part of the selection of payment details to use on the mobile device 110, the mobile device 110 may prompt the consumer 102 to share consumer data with the merchant. If the consumer 102 agrees to share consumer data with the merchant, the mobile device 110 may convey the shared consumer data to the point of sale 104 along with the payment details, such as in the same transmission or a separate transmission using the same communication channel, such as near field communication (NFC).

In some embodiments, the mobile device 110 may transmit an indication of consumer 102 approval to provide shared consumer data. In such an embodiment, the point of sale 104 may receive the approval and may submit the authorization request for the payment transaction to the transaction network 106, with the authorization request including the consumer's 102 indicated approval. The processing server 108 of the transaction network 106 may then identify the consumer data associated with the consumer 102 and provide it to the point of sale 104 as discussed above.

In some embodiments, the consumer 102 may also be able to prevent the future sharing of consumer data with merchants, and/or may unsubscribe from merchant content that is provided to the consumer 102 via the consumer's 102 shared data. For instance, the consumer 102 may (e.g., via the mobile device 110), update their preferences with the processing server 108. The updating of the preferences may include an instruction to no longer share consumer data with requesting merchants, or to notify merchants that the consumer 102 no longer wants to receive content. In such an instance, the processing server 108 may update the consumer's 102 profile accordingly, and may transmit a message to the point of sale 104 indicating that the consumer data associated with the consumer 102 is to no longer be used and/or be removed from the merchant system.

The use of the processing server 108 and/or mobile device 110 to share consumer data with a merchant may enable merchants to collect contact information from consumers 102, and may enable consumers 102 to share their data with merchants with increased speed and efficiency over traditional methods. The methods and systems discussed herein allow for automatic sharing of consumer data upon consumer consent, without the need for the consumer 102 or an employee of the merchant to input information manually, which may decrease the time it takes for sharing, remove the need for the consumer 102 to speak their information out loud, and thereby increase the likelihood for a consumer 102 to share their data.

Processing Server

Figure 2:
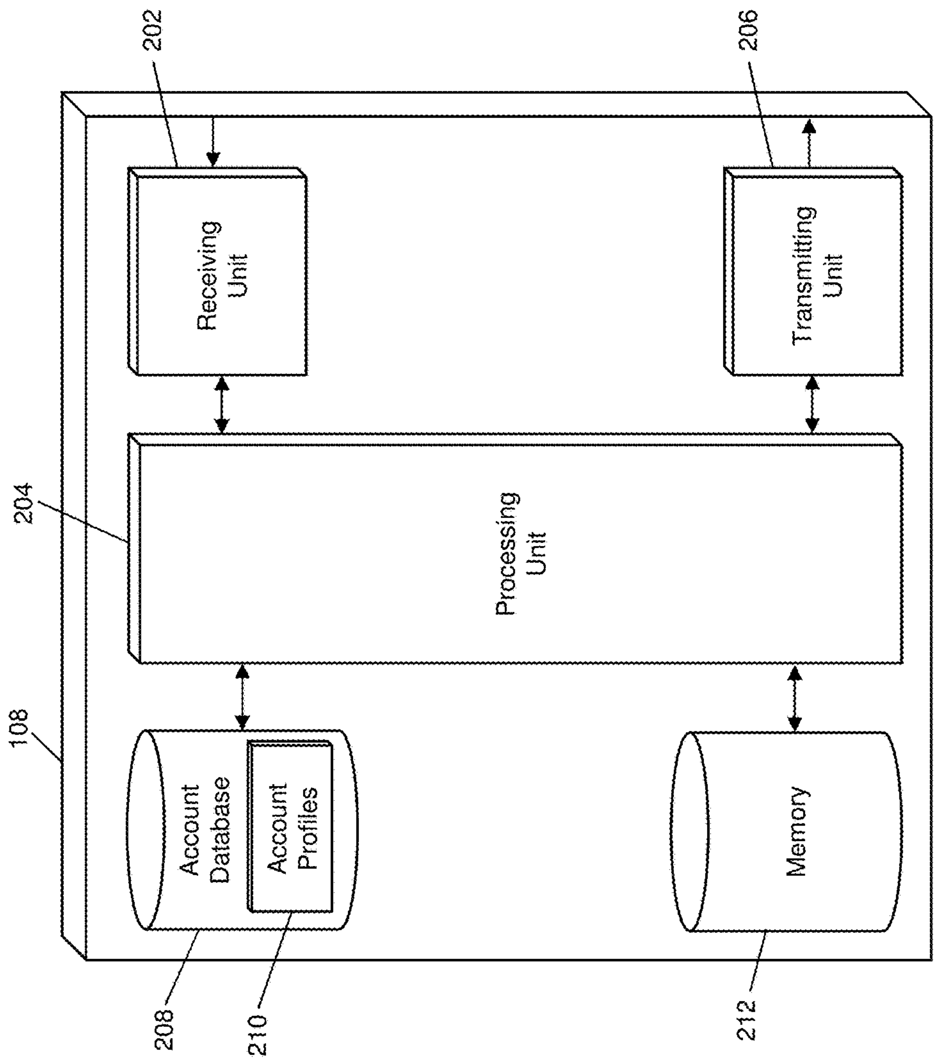
FIG. 2 is a block diagram illustrating the processing server of FIG. 1A for the sharing of consumer data with a merchant in accordance with exemplary embodiments.

FIG. 2 illustrates an embodiment of the processing server 108 of the system 100. It will be apparent to persons having skill in the relevant art that the embodiment of the processing server 108 illustrated in FIG. 2 is provided as illustration only and may not be exhaustive to all possible configurations of the processing server 108 suitable for performing the functions as discussed herein. For example, the computer system 1000 illustrated in FIG. 10 and discussed in more detail below may be a suitable configuration of the processing server 108.

The processing server 108 may include an account database 208. The account database 208 may be configured to store a plurality of account profiles 210. Each account profile 210 may include data related to a transaction account including at least an account identifier and a plurality of sharing data values. The account identifier may be a unique value suitable for identification of the respective account profile 210 and/or related transaction account, such as a transaction account number, name, username, email address, phone number, etc. The sharing data values may be, as discussed above, data associated with a consumer 102 associated with the related transaction account, such as contact information, demographic data, purchase data, etc.

The processing server 108 may also include a receiving unit 202. The receiving unit 202 may be configured to receive data over one or more networks via one or more network protocols. The receiving unit 202 may receive account data from the consumer 102, a financial institution (e.g., an issuing bank), a data reporting agency (e.g., a credit bureau), or any other suitable entity. The received account data may be stored in a respective account profile 210 in the account database 208 by a processing unit 204. The processing unit 204 may be any suitable type of processor configured to perform the functions disclosed herein as will be apparent to persons having skill in the relevant art.

The receiving unit 202 may be further configured to receive authorization requests for payment transactions. Each authorization request may include at least a specific account identifier and a sharing request. The processing unit 204 may be configured to identify an account profile 210 that includes the specific account identifier, and identify one or more sharing data values included therein based on the sharing request.

The processing server 108 may further include a transmitting unit 206 configured to transmit data over one or more networks via one or more network protocols. The processing server 108 may transmit the identified one or more sharing data values in response to the received authorization request. In some embodiments, the sharing data values may be included in an authorization response that indicates approval or denial of the payment transaction. In other embodiments, the sharing data values may be included in a separate message.

In some embodiments, the receiving unit 202 may be configured to receive requests for consumer data in messages separate from authorization requests. In other embodiments, if an authorization request is received that does not include a sharing request, and the processing unit 204 identifies an account profile 210 for the transaction that indicates consumer 102 consent to share consumer data, the transmitting unit 206 may be configured to transmit a message to the point of sale 104 that shared consumer data is available. In such an embodiment, the receiving unit 202 may subsequently receive a separate request for consumer data.

The processing server 108 may further include a memory 212. The memory 212 may be configured to store data suitable for performing the functions disclosed herein. For example, the memory 212 may store rules regarding data availability, rules regarding the transmitting of consumer data, encryption/decryption algorithms for consumer data and/or consent messages, and other data that will be apparent to persons having skill in the relevant art.

In embodiments where the processing server 108 may be configured to process payment transactions for the transaction network 106, the components of the processing server 108 may be further configured to perform the functions suitable for the processing of payment transactions as will be apparent to persons having skill in the relevant art. The processing server 108 may also include any additional components that may be necessary for the processing of payment transactions.

In some embodiments, the receiving unit 202 may be further configured to receive requests to update an account profile 210. In such an embodiment, the processing unit 204 may identify the account profile 210 corresponding to the request (e.g., using an account identifier included in the request), and then may perform an action as indicated in the request. For instance, if the request is to update the sharing data values and/or sharing permissions, the processing unit 204 may update the account profile 210 accordingly. In another example, if the request is to cancel merchant communications, the transmitting unit 206 may transmit a message to one or more merchants indicated in the request, which may instruct the merchant to stop providing new communications to the consumer 102 and/or delete the consumer's 102 shared data.

Point of Sale

Figure 3:
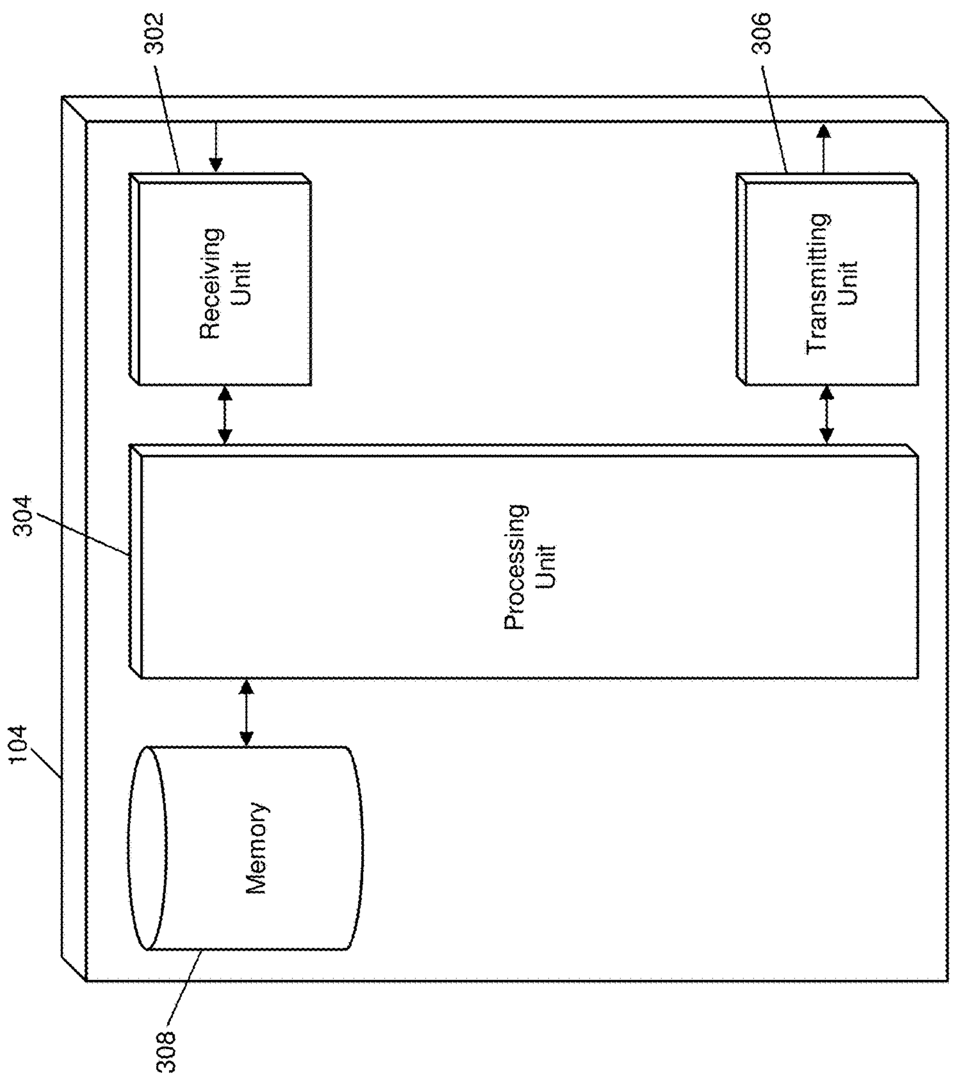
FIG. 3 is a block diagram illustrating the point of sale of FIGS. 1A and 1B for the receiving of shared consumer data in accordance with exemplary embodiments.

FIG. 3 illustrates an embodiment of the point of sale 104 of the system 100. It will be apparent to persons having skill in the relevant art that the embodiment of the point of sale 104 illustrated in FIG. 3 is provided as illustration only and may not be exhaustive to all possible configurations of the point of sale 104 suitable for performing the functions as discussed herein. For example, the computer system 1000 illustrated in FIG. 10 and discussed in more detail below may be a suitable configuration of the point of sale 104.

The point of sale 104 may include a receiving unit 302. The receiving unit 302 may be configured to receive data. The data may be received via one or more input devices, such as a keyboard, mouse, optical scanner, camera, click wheel, scroll wheel, touch screen, microphone, or any other suitable type of input device as will be apparent to persons having skill in the relevant art. The data may also be received via one or more networks via one or more network protocols. The receiving unit 302 may be configured to received transaction data for a payment transaction, such as via the scanning of universal product codes for products being purchased or the entry of products being purchased via an input device by a user (e.g., employee) of the point of sale 104.

The point of sale 104 may also include a memory 308. The memory 308 may be configured to store the received transaction data for a payment transaction being conducted. The memory 308 may also be configured to store any other data suitable for performing the functions disclosed herein as will be apparent to persons having skill in the relevant art. For example, the memory 308 may store shared consumer data.

The point of sale 104 may further include a processing unit 304. The processing unit 304 may be configured to perform the functions of the point of sale 104 discussed herein as will be apparent to persons having skill in the relevant art. In some embodiments, the processing unit 304 may be configured to generate an authorization request for a payment transaction based on the received transaction data stored in the memory 308. In other embodiments, the processing unit 304 may identify received and stored transaction data for transmission to a third party (e.g., an acquirer) for inclusion in an authorization request for a payment transaction.

The point of sale 104 may also include a transmitting unit 306. The transmitting unit 306 may be configured to transmit data over one or more networks via one or more network protocols. For instance, the transmitting unit 306 may be configured to transmit the identified transaction data or the generated authorization request to the processing server 108 for processing of the payment transaction. In some embodiments, the transmitted data may include a request for shared consumer data. In some instances, the request for shared consumer data may only be transmitted following receipt of an indication of consumer permission for sharing of the shared consumer data by the receiving unit 302.

The receiving unit 302 may be further configured to receive shared consumer data. The shared consumer data may be included in an authorization response for the payment transaction, or may be included in a separate message, which may accompany the authorization response in some instances. In some embodiments, the shared consumer data may correspond to requested sharing data values, which may have been specified in the sharing request, such as identified via the processing unit 304 or based on input received by the receiving unit 302.

In some embodiments, the receiving unit 302 may be configured to receive an indication of the availability of shared consumer data, such as in an authorization response or in a message accompanying an authorization response. In such an embodiment, the processing unit 304 may subsequently generate a sharing request, which may be transmitted by the transmitting unit 306 to the processing server 108. The receiving unit 302 may later receive the shared consumer data.

In some instances, the receiving unit 302 may be further configured to receive an update request from the processing server 108 regarding the consumer 102. In such an embodiment, the processing unit 304 may perform an action based on the request, such as updating shared consumer data stored in the memory 308, removing shared consumer data from the memory 308, updating a mailing list stored in the memory 308 to remove the consumer 102, instructing the transmitting unit 306 to transmit a message to a different computing device in the merchant system to remove the consumer 102 from a mailing list, etc. In some embodiments, the transmitting unit 306 may transmit a confirmation to the processing server 108 to confirm successful performing of the action requested in the update request.

It will be apparent to persons having skill in the relevant art that the point of sale 104 may include further components as necessary to perform the traditional functions of a point of sale and for use in performing the functions disclosed herein. For instance, the point of sale 104 may include a display unit configured to display data to a user (e.g., the consumer 102 or an employee), such as a liquid crystal display, light-emitting diode display, etc. configured to display transaction data, a prompt for consumer consent to share data, received shared consumer data, etc.

Mobile Device

Figure 4:
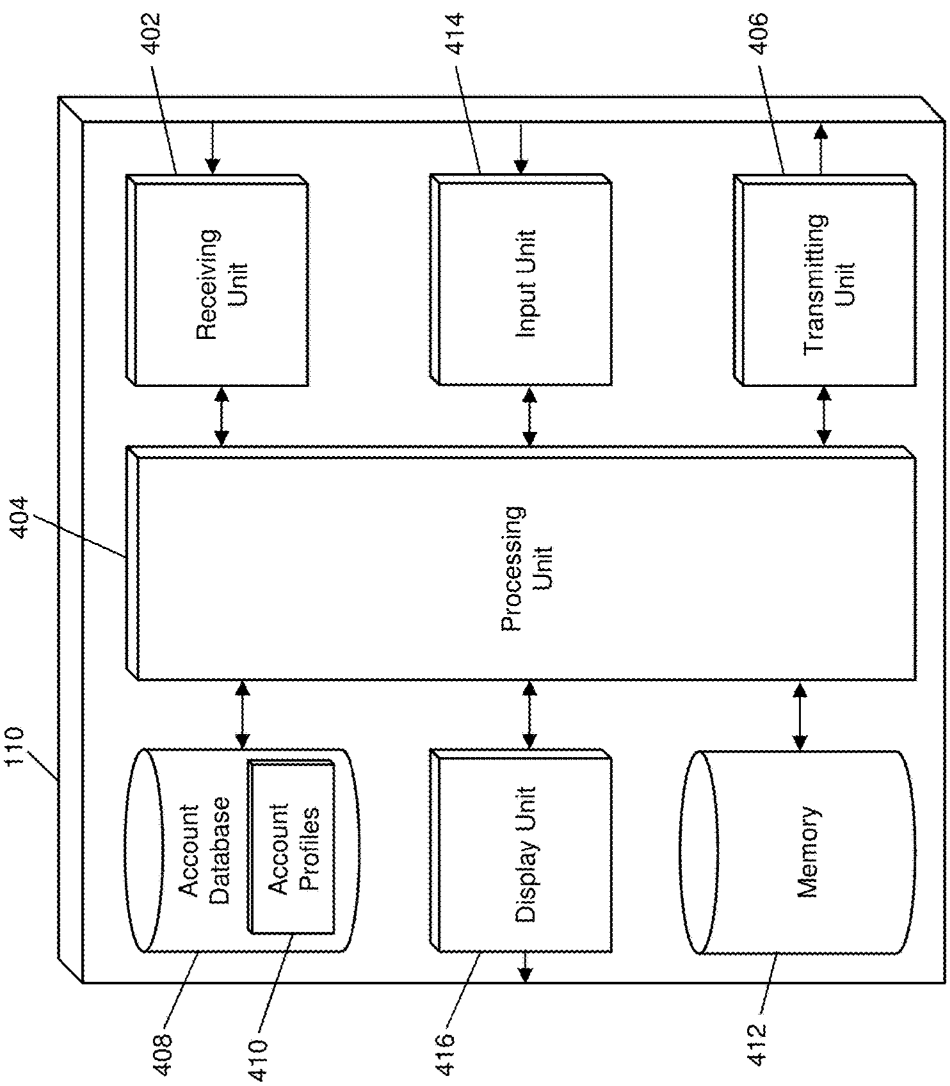
FIG. 4 is a block diagram illustrating the mobile device of FIG. 1B for the sharing of consumer data with a merchant in accordance with exemplary embodiments.

FIG. 4 illustrates an embodiment of the mobile device 110 of the system 100. It will be apparent to persons having skill in the relevant art that the embodiment of the mobile device 110 illustrated in FIG. 3 is provided as illustration only and may not be exhaustive to all possible configurations of the mobile device 110 suitable for performing the functions as discussed herein. For example, the computer system 1000 illustrated in FIG. 10 and discussed in more detail below may be a suitable configuration of the mobile device 110.

The mobile device 110 may include an account database 408. The account database 408 may be configured to store one or more account profiles 410. Each account profile 410 may include data related to a transaction account, such as an account identifier and payment credentials. In some embodiments, the account database 408 may be comprised of or may be stored in a secure element of the mobile device 110. In some instances, the account database 408 may be part of, or otherwise accessed via, an electronic wallet application program.

The mobile device 110 may further include a processing unit 404. The processing unit 404 may be configured to perform the functions of the mobile device 110 disclosed herein as well as the traditional functions of a mobile device 110 that will be apparent to persons having skill in the relevant art. The processing unit 404 may be configured to execute an electronic wallet application program or other type of application program suitable for the selection of an account profile 410 for use in conveying payment credentials to the point of sale 104 for funding of a payment transaction.

Program code for use in the execution of an application program may be stored in a memory 412. The memory 412 may be further configured to store any other data suitable for performing the functions disclosed herein as will be apparent to persons having skill in the relevant art.

Data may be displayed to the consumer 102 via one or more display units 416. Each display unit 416 may be configured to display data to a user of the mobile device 110 (e.g., the consumer 102) using methods and devices that will be apparent to persons having skill in the relevant art. The display unit 416 may be a liquid crystal display, light-emitting diode display, touch screen display, thin film transistor display, or any other suitable type of display device. The display unit 416 may display, for instance, an account selection to the consumer 102, a request to provide shared data to a merchant, etc.

The mobile device 110 may also include one or more input units 414. Each input unit 414 may be configured to receive input from the user of the mobile device using methods and devices that will be apparent to persons having skill in the relevant art. For instance, the input unit 414 may be a keyboard, mouse, click wheel, scroll wheel, touch screen, camera, microphone, biometric reader, optical scanner, etc. The input unit 414 may be configured to receive input regarding the selection of an account profile 410 used to fund a payment transaction, approval or denial of the sharing of consumer data with a merchant, and other input as will be apparent to persons having skill in the relevant art.

The mobile device 110 may further include a transmitting unit 406. The transmitting unit 406 may be configured to transmit data over one or more networks via one or more network protocols. The transmitting unit 406 may transmit payment credentials and, if applicable, an indication of approval for the sharing of consumer data to the point of sale 104. Transmission of data to the point of sale 104 may be via NFC, radio frequency, Bluetooth, Wi-Fi, wireless area network, local area network, or any other suitable method. In some embodiments, the transmitting unit 406 may transmit the shared consumer data to the point of sale 104. The shared consumer data may be stored in the memory 412 or in the account database 408, such as in instances where each account profile 410 may include sharing data values. For example, the consumer 102 may provide different shared data values (e.g., different contact information, different levels of information, etc.) for different account profiles 410 for use in sharing with merchants.

The mobile device 110 may also include a receiving unit 402. The receiving unit 402 may be configured to receive data over one or more networks via one or more network protocols. The receiving unit 402 may be configured to receive transaction data from the point of sale 104 and any other data suitable for performing the functions of the mobile device 110 discussed herein and the traditional functions of a mobile device 110 as will be apparent to persons having skill in the relevant art.

First Process for Sharing Consumer Data

Figure 5:
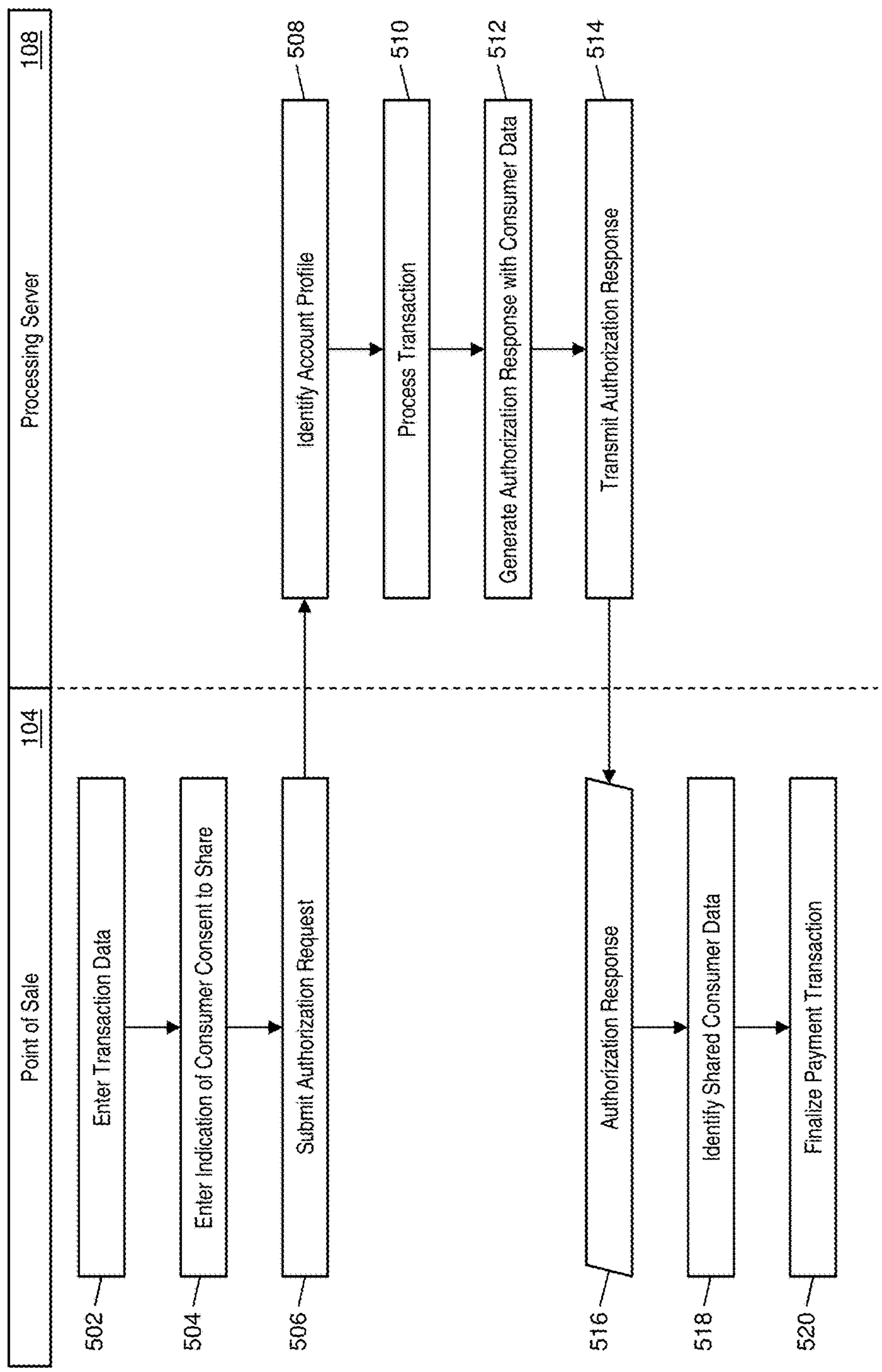
FIG. 5 is a flow diagram illustrating a process for sharing consumer data in an authorization response in accordance with exemplary embodiments.

FIG. 5 illustrates a first process for the sharing of consumer data to a merchant via the inclusion of shared consumer data in an authorization response or accompanying message.

In step 502, transaction data for one or more products being purchased may be entered into the point of sale 104, such as via an input device used by an employee of the merchant and/or the consumer 102. The transaction data may include payment details provided by the consumer 102, such as an account identifier read from a payment card. In step 504, an indication of consumer 102 consent to share consumer data may be entered into the point of sale 104 by the employee and/or the consumer 102. In step 506, the point of sale 104 (e.g., or an acquirer based on receipt of data from the point of sale 104) may generate an authorization request for the payment transaction and submit it (e.g., via the transmitting unit 306) to the processing server 108.

In step 508, the receiving unit 202 of the processing server 108 may receive the authorization request. The authorization request may include at least the account identifier associated with the transaction account used to fund the payment transaction and the indication of consumer consent to share consumer data. In step 510, the processing unit 204 of the processing server 108 may process the transaction using methods and systems that will be apparent to persons having skill in the relevant art. In step 512, the processing unit 204 may generate an authorization response for the transaction indicating approval or denial of the transaction based on the processing. The authorization response may also include one or more sharing data values stored in an account profile 210 that includes the account identifier included in the authorization request, as identified by the processing unit 204. In some embodiments, the sharing data values may be included in a separate message transmitted accompanying the authorization response.

In step 514, the transmitting unit 206 of the processing server 108 may transmit the authorization response with shared consumer data to the point of sale 104. In step 516, the receiving unit 302 of the point of sale 104 may receive the authorization response. In step 518, the processing unit 304 of the point of sale 104 may identify the one or more sharing data values included in the authorization response, and may use the data accordingly, such as by storing it in the memory 308, transmitting it to a computer system of the merchant, etc. In step 520, the point of sale 104 may finalize the payment transaction, such as by printing a receipt for the consumer 102, displaying an approval message, displaying a confirmation webpage to the consumer 102, etc.

Second Process for Sharing Consumer Data

Figure 6:
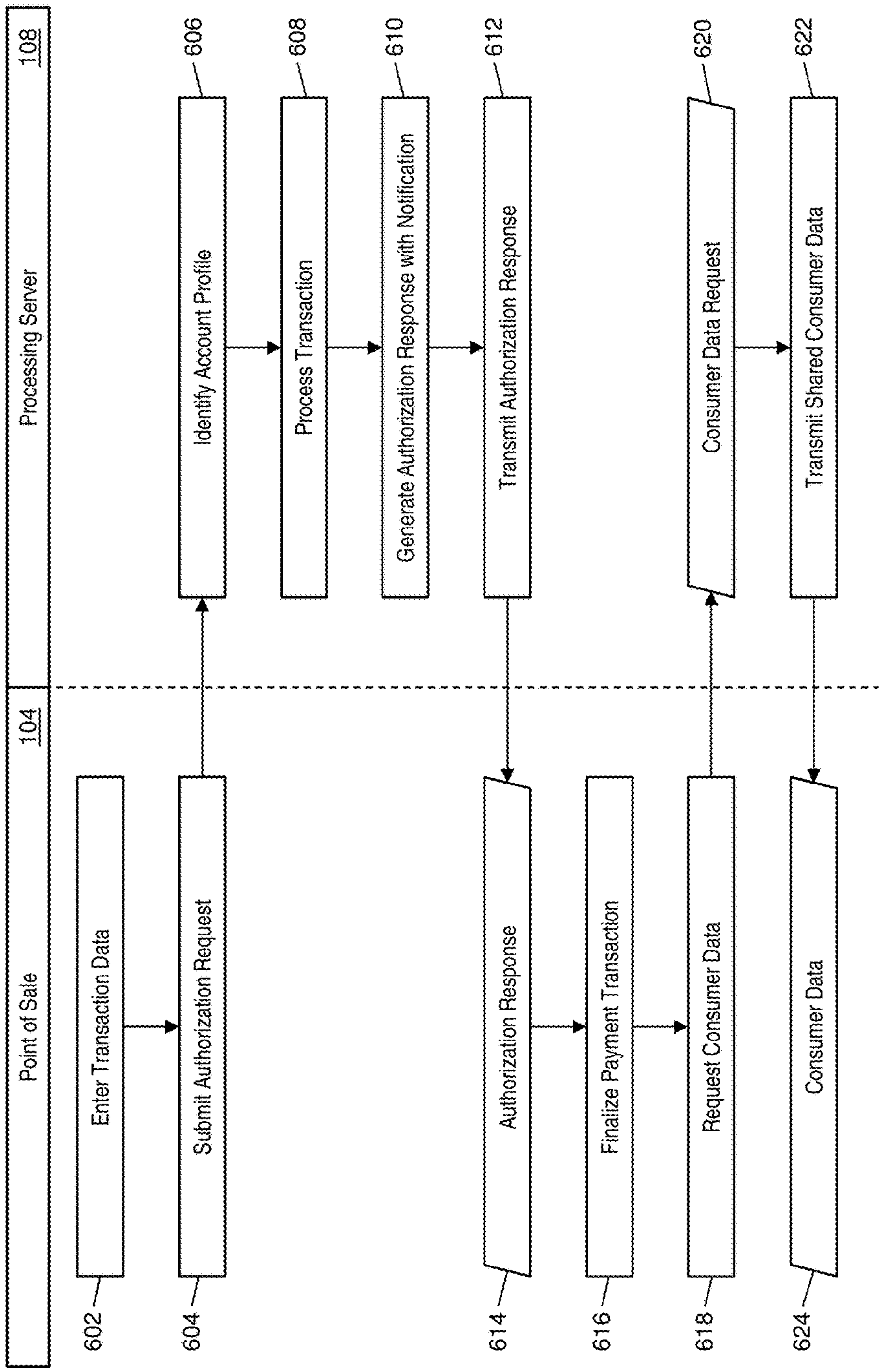
FIG. 6 is a flow chart illustrating a process for sharing consumer data following processing of a payment transaction in accordance with exemplary embodiments.

FIG. 6 illustrates a second process for the sharing of consumer data to a merchant via a request for shared consumer data provided subsequent the processing of a payment transaction.

In step 602, transaction data for one or more products being purchased may be entered into the point of sale 104, such as via an input device used by an employee of the merchant and/or the consumer 102. The transaction data may include payment details provided by the consumer 102, such as an account identifier read from a payment card. In step 604, the point of sale 104 (e.g., or an acquirer based on receipt of data from the point of sale 104) may generate an authorization request for the payment transaction and submit it (e.g., via the transmitting unit 306) to the processing server 108.

In step 606, the receiving unit 202 of the processing server 108 may receive the authorization request and the processing unit 204 may identify an account profile 210 stored in the account database 208 that includes an account identifier corresponding to the account identifier provided by the consumer 102 and included in the authorization request. In step 608, the processing unit 204 of the processing server 108 may process the transaction using methods and systems that will be apparent to persons having skill in the relevant art. In step 610, the processing unit 204 may generate an authorization response for the transaction indicating approval or denial of the transaction based on the processing. The authorization response may also include a notification that the consumer 102 has previously provided consent to share consumer data and that such data is available.

In step 612, the transmitting unit 206 of the processing server 108 may transmit the authorization response with the notification to the point of sale 104. In step 614, the receiving unit 302 of the point of sale 104 may receive the authorization response. In step 616, the point of sale 104 may finalize the payment transaction, such as by printing a receipt for the consumer 102, displaying an approval message, displaying a confirmation webpage to the consumer 102, etc. In step 618, the transmitting unit 306 of the point of sale 104 may transmit a request for consumer data to the processing server 108 as a result of the notification of consumer consent being included in the received authorization response. In some embodiments, the request may be transmitted on payment rails. In other embodiments, the request may be transmitted via a separate method of communication with the processing server 108.

In step 620, the receiving unit 202 may receive the consumer data request, which may identify one or more requested data values. In step 622, the processing unit 204 may identify the corresponding sharing data values in the identified account profile 210, and the transmitting unit 206 may transmit the identified sharing data values to the point of sale 104. In step 624, the receiving unit 302 may receive the shared consumer data.

Third Process for Sharing Consumer Data

Figure 7:
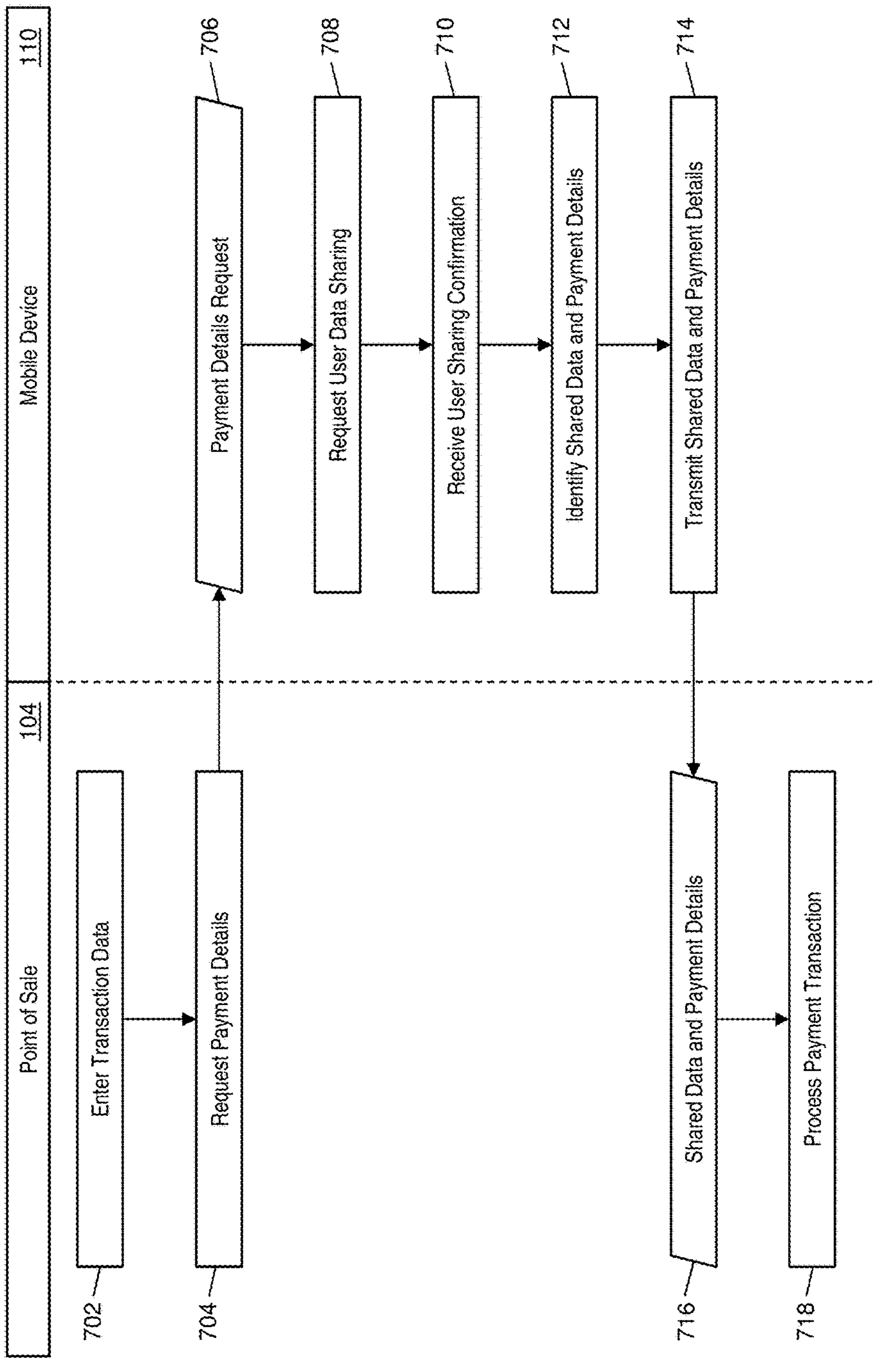
FIG. 7 is a flow chart illustrating a process for sharing consumer data with a merchant using a mobile device in accordance with exemplary embodiments.

FIG. 7 illustrates a third process for the sharing of consumer data to a merchant via the sharing of consumer data using the mobile device 110.

In step 702, transaction data for one or more products being purchased may be entered into the point of sale 104, such as via an input device used by an employee of the merchant and/or the consumer 102. In step 704, the transmitting unit 306 of the point of sale 104 may transmit a request for payment details to the mobile device 110, such as via a pre-established path of communication. For instance, the transmitting unit 306 may transmit the request to the mobile device 110 using NFC.

In step 706, the receiving unit 402 of the mobile device 110 may receive the payment details request. In step 708, the display unit 416 of the mobile device 110 may display a request for the selection of an account profile 410, if applicable, and may request consent from the consumer 102 to share consumer data with the point of sale 104. In some embodiments, the displayed request for consent may be included based on the inclusion of a request for consumer shared data included in the payment details request.

In step 710, the input unit 414 of the mobile device 104 may receive input from the consumer 102 selecting an account profile 410 to fund the payment transaction, if applicable, and indicating approval to share consumer data with the point of sale 104. In step 712, the processing unit 404 may identify the payment details included in the selected account profile 410 and the sharing data values included in the selected account profile 410 and/or stored in the memory 412. In step 714, the transmitting unit 406 may transmit the payment details and sharing data values to the point of sale 104.

In step 716, the receiving unit 302 of the point of sale 104 may receive the payment details for the payment transaction and the shared consumer data. The point of sale 104 may use the received shared consumer data accordingly, such as by storing it in the memory 308, transmitting it to a computer system of the merchant, etc. In step 718, the processing unit 304 may begin the processing of the payment transaction using the received payment details, using methods and systems that will be apparent to persons having skill in the relevant art.

Exemplary Method for Sharing Consumer Data with a Merchant

Figure 8:
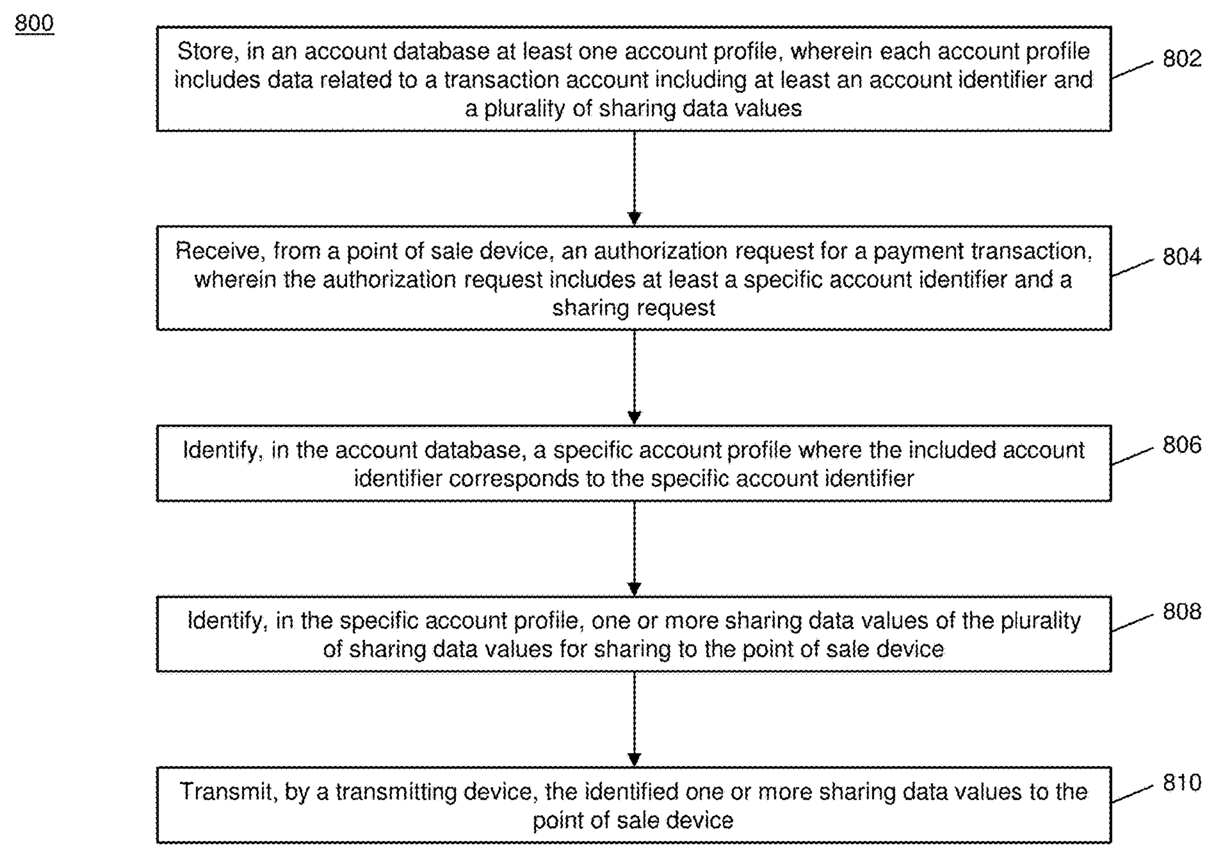
FIG. 8 is a flow chart illustrating an exemplary method for sharing consumer data with a merchant in accordance with exemplary embodiments.

FIG. 8 illustrates a method 800 for the sharing of consumer data with a merchant.

In step 802, at least one account profile (e.g., account profile 210) may be stored in an account database (e.g., the account database 208), wherein each account profile 210 includes data related to a transaction account including at least an account identifier and a plurality of sharing data values. In step 804, an authorization request for a payment transaction may be received from a point of sale device (e.g., the point of sale 104), wherein the authorization request includes at least a specific account identifier and a sharing request.

In step 806, a specific account profile 210 may be identified in the account database 208 where the included account identifier corresponds to the specific account identifier. In step 808, one or more sharing data values of the plurality of sharing data values may be identified in the specific account profile 210 for sharing to the point of sale device 104.

In step 810, the identified one or more sharing data values may be transmitted to the point of sale device 104 by a transmitting device (e.g., the transmitting unit 206). In one embodiment, the one or more sharing data values may be transmitted as part of an authorization response for the payment transaction. In another embodiment, the sharing data values may be transmitted as a message separate from an authorization response for the payment transaction.

In one embodiment, each account profile 210 may further include a device identifier, and the method 800 may further include: transmitting, by the transmitting device 206, a confirmation request to a computing device (e.g., the mobile device 110) associated with the device identifier included in the specific account profile 210; and receiving, by the receiving device 202, a confirmation response from the computing device indicating confirmation of sharing, wherein the sharing data values are transmitted to the point of sale device 104 after receipt of the confirmation response from the computing device.

Exemplary Method for Receiving Shared Consumer Data

Figure 9:
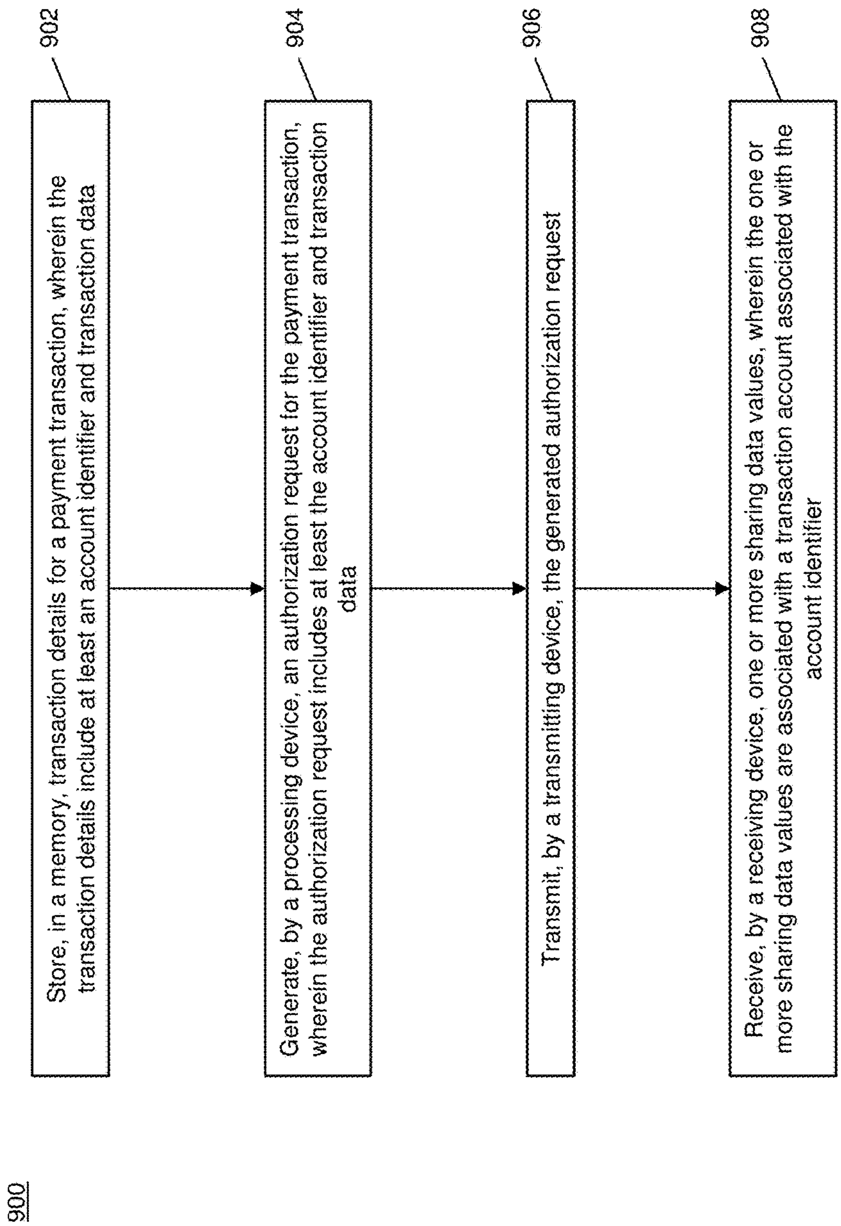
FIG. 9 is a flow chart illustrating an exemplary method for receiving shared consumer data in accordance with exemplary embodiments.

FIG. 9 illustrates a method 900 for receiving shared consumer data during a payment transaction.

In step 902, transaction details for a payment transaction may be stored in a memory (e.g., the memory 308), wherein the transaction details include at least an account identifier and transaction data. In step 904, an authorization request for the payment transaction may be generated by a processing device (e.g., the processing unit 304), wherein the authorization request includes at least the account identifier and transaction data. In step 906, a transmitting device (e.g., the transmitting unit 306) may transmit the generated authorization request.

In step 908, one or more sharing data values may be received by a receiving device (e.g., the receiving unit 302), wherein the one or more sharing data values are associated with a transaction account associated with the account identifier. In some embodiments, the one or more sharing data values may be received from a mobile communication device (e.g., mobile device 110) associated with the transaction account. In one embodiment, the authorization request may further include one or more sharing data fields, and the received one or more sharing data values may correspond to the one or more sharing data fields included in the authorization request.

In some embodiments, the method 900 may further include: receiving, by the receiving device 302, an authorization request, wherein the authorization response includes an indication of availability of sharing data associated with the transaction account; and transmitting, by the transmitting device 306, a request for sharing data, wherein the received one or more sharing data values are received in response to the transmitted request for sharing data. In a further embodiment, the request for sharing data may further include one or more sharing data fields, and the received one or more sharing data values may correspond to the one or more sharing data fields included in the request for sharing data.

Computer System Architecture

Figure 10:
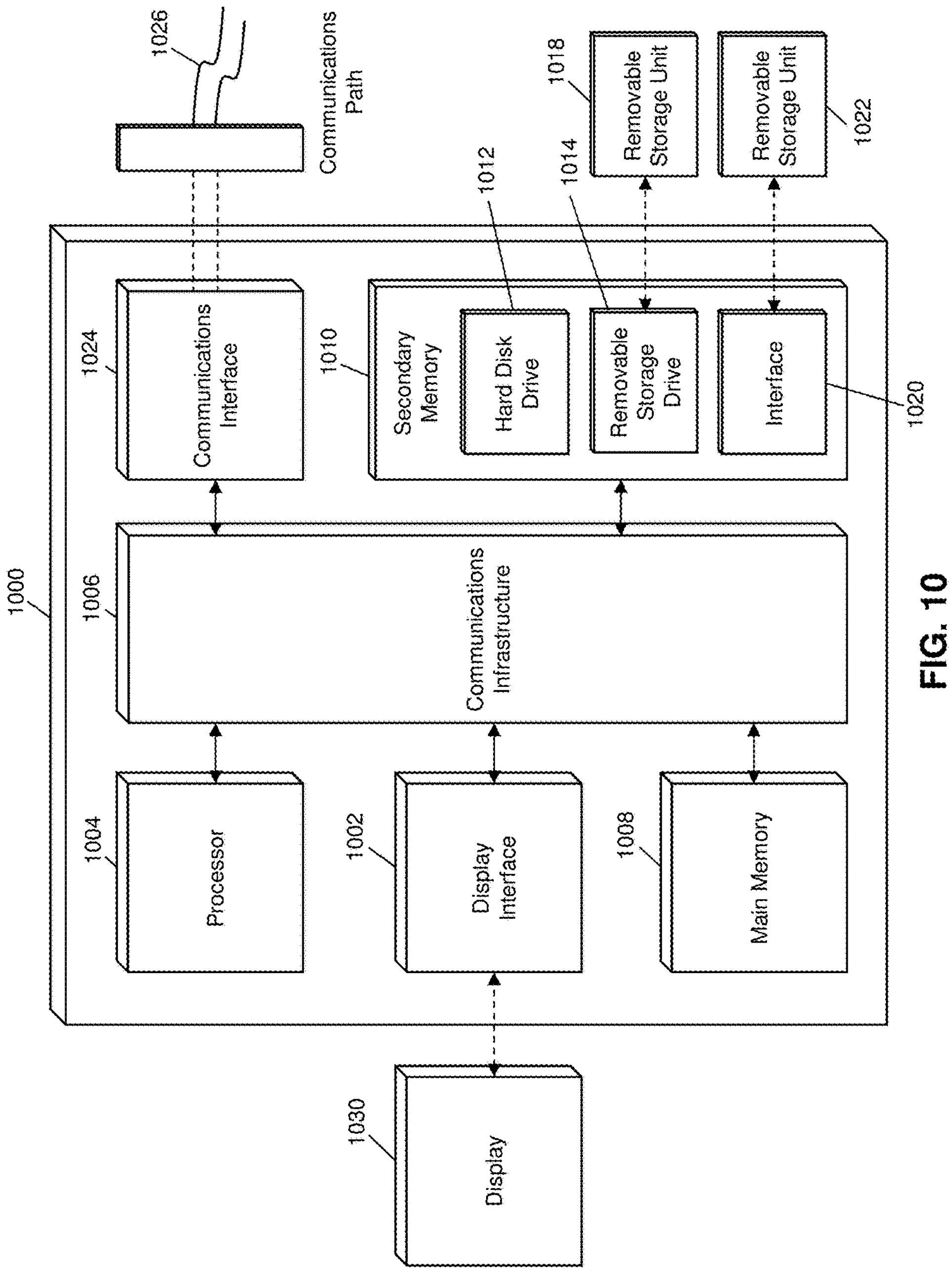
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the processing server 108, point of sale 104, and mobile device 110 of FIGS. 1A and 1B may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5-9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 5-9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

Techniques consistent with the present disclosure provide, among other features, systems and methods for sharing consumer data with a merchant and receiving shared consumer data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for sharing consumer data of a consumer with a merchant as part of a payment transaction through a single communication, comprising:

storing, in an account database of a processing server, at least one account profile, wherein each account profile includes data related to a transaction account including at least an account identifier and a plurality of sharing data values;

receiving, from a point of sale device, an authorization request for a payment transaction by the processing server, wherein the authorization request is transmitted to the processing server via a transaction network and includes at least a specific account identifier and a sharing request, where the sharing request is an indication of consumer consent to share consumer data;

receiving, from a third party, an authorization response for the payment transaction by the processing server, wherein the authorization response includes an indication of approval or denial of the payment transaction;

identifying, in the account database of the processing server, a specific account profile where the included account identifier corresponds to the specific account identifier;

identifying, in the specific account profile, one or more sharing data values of the plurality of sharing data values for sharing to the point of sale device, wherein the one or more sharing data values includes at least one of contact information, demographic information, spending information, and loyalty information;

including, in the authorization response, the identified one or more sharing data values;

transmitting, by a transmitting device of the processing server, the authorization response including the identified one or more sharing data values to the point of sale device using the transaction network; and providing, to the consumer, based on the received shared data values, content that can lead to further business with the consumer.

2. The method of claim 1, wherein the authorization request further includes one or more specified sharing data fields, and the identified one or more sharing data values correspond to the one or more specified sharing data fields.

3. The method of claim 1, wherein each account profile further includes a device identifier, and the method further comprises:

transmitting, by the transmitting device, a confirmation request to a computing device associated with the device identifier included in the specific account profile; and receiving, by the receiving device, a confirmation response from the computing device indicating confirmation of sharing, wherein the identified one or more sharing data values are transmitted to the point of sale device after receipt of the confirmation response from the computing device.

* * * * *